Figure 1:
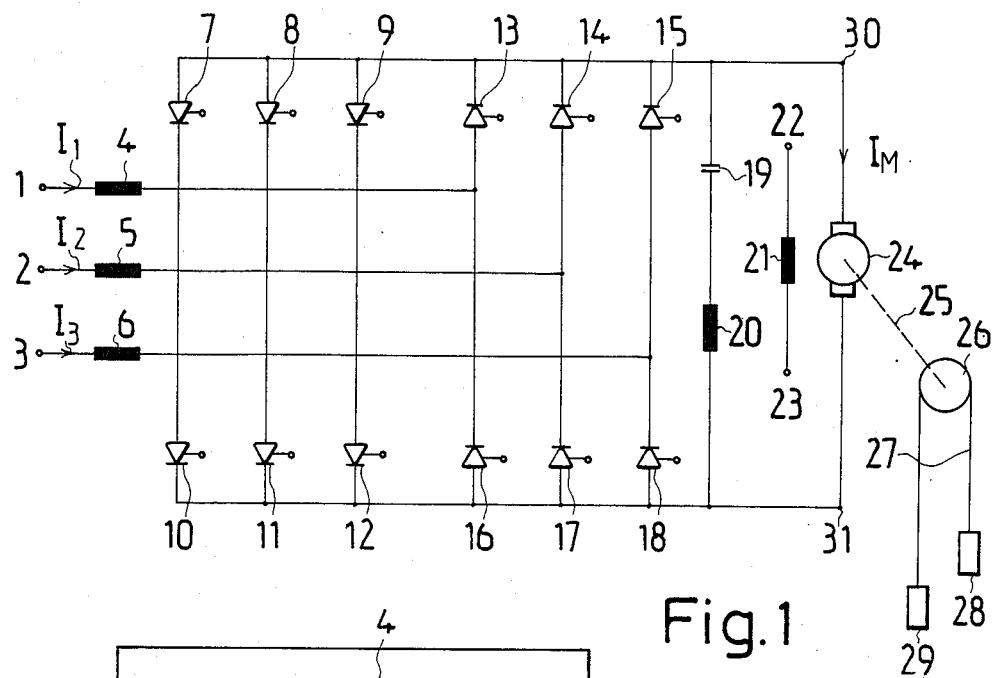

United States Patent [19]

Kähkipuro

[11] Patent Number: 4,663,700
[45] Date of Patent: May 5, 1987

[54] WAY OF PLACING CHOKES WITH AIR CORE

[75] Inventor: Matti J. Kähkipuro, Hyvinkää, Finland

[73] Assignee: Elevator GmbH, Baar, Switzerland

[21] Appl. No.: 910,828

[22] Filed: Sep. 23, 1986

Related U.S. Application Data

[63] Continuation of Ser. No. 749,201, Jun. 27, 1985.

[30] Foreign Application Priority Data

Jun. 27, 1984 [FI] Finland .................................. 842584

[51] Int. Cl.⁴ ............................................ H02M 1/06
[52] U.S. Cl. .......................................... 363/54; 336/5; 363/63; 363/129
[58] Field of Search ..................... 363/54, 44, 63, 126, 363/129, 161, 39, 45, 47; 336/5, 10, 12

[56] References Cited

U.S. PATENT DOCUMENTS 3,428,920  2/1969  Oleksiak ............................. 336/170

FOREIGN PATENT DOCUMENTS 1053650  3/1959  Fed. Rep. of Germany .......... 336/5
2042107  3/1972  Fed. Rep. of Germany ........ 363/63
2061638  5/1981  United Kingdom .................. 363/44

Primary Examiner—William H. Beha, Jr.
Attorney, Agent, or Firm—Browdy and Neimark

[57] ABSTRACT

A way of placing chokes with air core, such as thyristor commutating chokes, in a three-phase alternating current rectifier. With a view to eliminating the drawbacks of air-core chokes especially in three-phase rectifying applications, the three chokes of three phases, wound in the same winding direction, are placed on one and the same plane at the corner points of an imagined triangle which brings the chokes as close together as possible.

2 Claims, 7 Drawing Figures

WAY OF PLACING CHOKES WITH AIR CORE

This application is a continuation of application Ser. No. 749,201, filed June 27, 1985.

The present invention concerns a way of placing choke coils with air core, such as thyristor commutating chokes, in a three-phase alternating current rectifier.

It is common knowledge that the commutation chokes of rectifiers should have an air core. This is due to several advantages of air-core chokes, of which the following may be mentioned. A choke with air core cannot become saturated and therefore the inductance values are unchanged even in overload current situations. Another advantage is the better operation of an air-core choke at high frequencies. The third advantage that may be mentioned is low losses. This is because a choke with iron core has its iron loses in addition to the copper losses.

There are, however, some difficulties in using air-core chokes. One of them that deserves to be mentioned is the magnetic field which a choke of this type radiates into its ambience. Therefore in pieces of equipment comprising a plurality of air core chokes these chokes have to be placed far apart so that there might be no mutual interference. The result are design solutions which require ample space. Another problem is the low inductance of air-core chokes, in relation to the number of wire turns that are used.

The object of the invention is to provide a way of placing the air-core chokes operating from three-phase mains in such a way that the above-mentioned problems are eliminated. The way of placing of the invention is therefore mainly characterized in that the three chokes of the three phases, wound in the same direction, are placed on the same plane at the corner points of an imagined triangle which brings the chokes as close to each other as possible. In the three-phase applications in question, there always prevails in the chokes a certain cymmetric state which according to the invention affords the possibility to utilize the mutual inductance, without any asymmetry in the currents resulting therefrom. Thanks to this insight, the air-core chokes can be compactly placed, and at the same time the magnitude of the available inductance can be increased.

An advantageous embodiment of the way of the invention of placing chokes is characterized in that the chokes have been mounted on a base plate of electrically non-conductive material.

Figure 3:
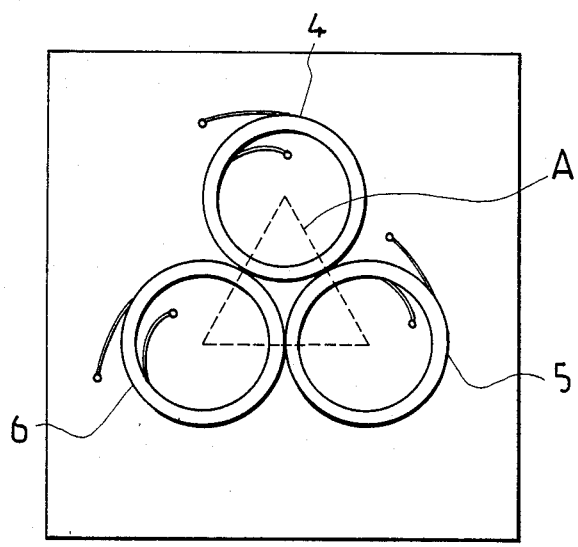
Figure 4:
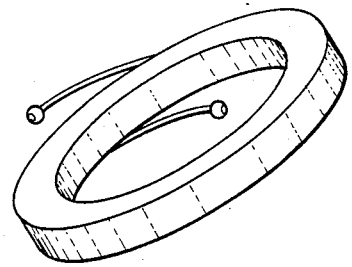

In the following, the invention is more closely described with the aid of an example with reference made to the attached drawings, wherein:

FIG. 1 presents a thyristor rectifying bridge, known in the art, in which the invention can be applied, FIGS. 2a-2d display various curve shapes of the currents flowing in the commutation chokes of FIG. 1, FIG. 3 presents the way of the invention of placing the air chokes, FIG. 4 presents the choke considered in the invention, in a three-dimensional drawing.

FIG. 1 presents a rectifying bridge, usable e.g. in lift driving. The rectifying bridge has been provided with a noise suppression resonator 19 and 20. This noise suppression technique has been more closely described in the Finnish Pat. No. 61252. Apart from this, the circuit is a common four-quadrant, three-phase, six-pulse thyristor rectifier. The rectifier derives its supply from the terminals 1, 2 and 3 of the a.c. mains. The chokes 4, 5 and 6 serve as commutating members of the thyristor bridges.

The rectifier comprises two thyristor bridges, which operate separately and control the motor 24. One bridge consists of the thyristors 7–12 and the other of the thyristors 13–18. In normal operation, only one bridge at a time is operative, depending on the direction of the current which the motor needs. The motor 24 drives the driving wheel 26 over the shaft 25. On the driving wheel 26 run ropes 27, which further impart motion to the counterweight 29 and the lift car 28. The magnetizing coil of the motor has been indicated with reference numeral 21 and its connection terminals, with 22 and 23. The motor has constant magnetization in normal conditions.

Figure 2:
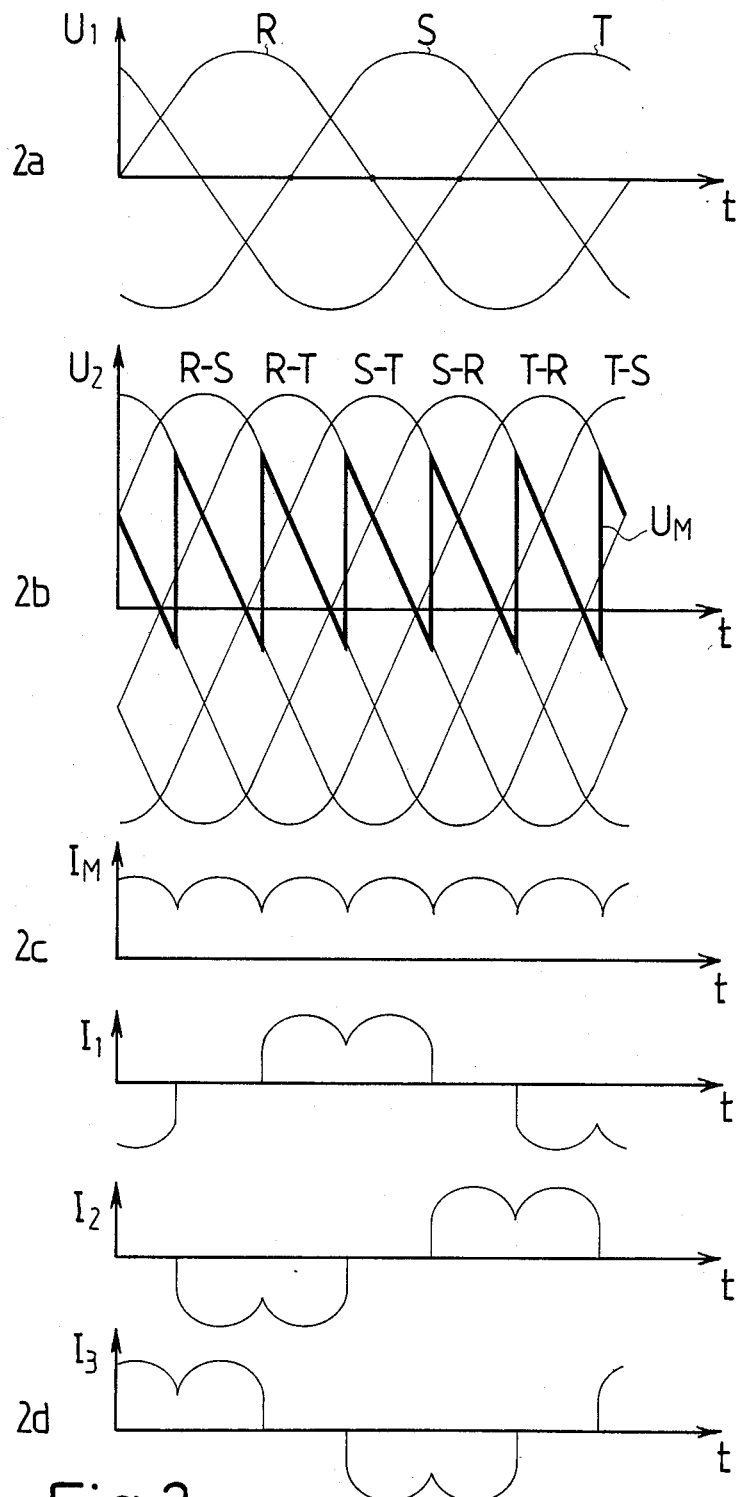

Let us next examine FIG. 2, in which have been depicted the currents flowing in the commutation chokes. In FIG. 2a, the voltage U1 represents the three-phase, supply mains voltage. Thus the three-phase voltages are R, S and T. When one or the other of the aforementioned thyristor bridges is operative, the voltage appearing across the motor terminals is formed as differences of the mains voltages R, S and T. These differential voltages are shown in FIG. 2b, in the coordinates U2. The differential voltages have been denoted with R-S, R-T, S-T, S-R, T-R and T-S. In the figure has also been depicted the typical control situation of the thyristors, under which the voltage Um is established across the motor terminals. The voltage Um further generates in the motor the current Im as shown in FIG. 2c. The respective curve shapes imply that there exists, in the motor, an appropriate counter-voltage as a result of the motor's rotation. The effect of the counter-voltage is obvious to a person skilled in the art and shall therefore not be considered here, in order to simplify the matter.

One may conclude from the above voltages and from the motor current that the currents of the commutation chokes are as the currents I1, I2 and I3 in FIG. 2d, and these we shall consider next. We find that at any given time current is always flowing in two chokes only. Moreover, these currents are equal but they have opposite signs. One choke, each one in turn, carries no current. We may on this basis consider what is going to happen if the chokes are placed in the way which FIG. 3 shows. The chokes are located as close together as possible in one and the same plane, at the corner points of an imagined triangle A. We find that if for instance chokes 4 and 5 are carrying current and choke 6 is free of current, chokes 4 and 5 will reinforce each other owing to mutual inductance effect and the total inductance will be higher than the sum of the partial inductances. It is further noted that since the third inductance carries no current, it suffers no interference from the magnetic field of the other two inductances. Since the situation is completely symmetrical, the situation remains similar all the time. It follows that the chokes introduce no asymmetry in the currents although there is a powerful mutual inductance between them, owing to proximity.

The operation just described is only possible if the direction of the turns is the same in all chokes. This implies in the case of FIG. 3 that the positive current circulates clockwise in each coil. It is thus advisable to place the chokes as close to each other as possible with a view to maximizing the mutual inductance. A small spacing is however required in order that the chokes might be electrically insulated from each other. In FIG.

3, the chokes have been mounted on a baseplate 32, regarding which may be said that a non-magnetic, and preferably electrically non-conductive, material should be used to this purpose. Moreover, with the warming-up of the chokes in mind, it is well to select materials which are as heat-resistant as possible.

The choke baseplate is mounted in a suitable cabinet or on a stand. Care should be taken also in constructing the cabinet that no electrically conductive and magnetic materials are installed too close to the magnetic field of the chokes.

It is possible, of course, to place the chokes close to each other in a way other than that of the invention. In that case, however, the mutual inductances give rise to asymmetry of the currents, and this is detrimental to the operation of the rectifier.

It is obvious to a person skilled in the art that different embodiments of the invention are not confined to the example presented in the foregoing and that they may rather vary within the scope of the claims following below. For instance, the invention is not exclusively confined to thyristor rectifiers: in connection with diode rectifiers the same way of placing may also be applied. The invention may also be applied in connection with other types of three-phase rectifying circuits.

I claim:

1. A three phase choke unit in a three phase alternating current rectifier, said unit comprising:

three chokes, each of said chokes having an air core,
   each choke being wound cylindrically in the same winding direction, and
   said choke being situated on one and the same plane at the corner points of an imagined triangle in order to bring the chokes as close together as possible, so that maximal mutual inductance between chokes is attained.

2. A three phase choke unit according to claim 1, wherein said chokes are mounted on a baseplate of electrically non-conductive material.

* * * * *